US012608697B2

(12) United States Patent
Behera et al.

(10) Patent No.: US 12,608,697 B2
(45) Date of Patent: Apr. 21, 2026

(54) COLOR-CHANGING SMART CARD

(71) Applicant: Bank of America Corporation,
Charlotte, NC (US)

(72) Inventors: Abhijit Behera, Hyderabad (IN);
Maneesh Kumar Sethia, Hyderabad
(IN); Nandini Rathaur, Mumbai (IN);
Sandeep Kumar Chauhan, Hyderabad
(IN); Shailendra Singh, Maharashtra
(IN); Gowri Sundar Suriyanarayanan,
Tamil Nadu (IN)

(73) Assignee: Bank of America Corporation,
Charlotte, NC (US)

( * ) Notice: Subject to any disclaimer, the term of this
patent is extended or adjusted under 35
U.S.C. 154(b) by 496 days.

(21) Appl. No.: 18/203,114

(22) Filed: May 30, 2023

(65) Prior Publication Data

US 2024/0403851 A1 Dec. 5, 2024

(51) Int. Cl.
*G06Q 20/20* (2012.01)
*G06K 7/10* (2006.01)
*G06K 19/07* (2006.01)
*G06K 19/077* (2006.01)

(52) U.S. Cl.
CPC ....... *G06Q 20/208* (2013.01); *G06K 7/10297*
(2013.01); *G06K 19/0723* (2013.01); *G06K*
*19/07722* (2013.01)

(58) Field of Classification Search
CPC ............. G06Q 20/208; G06K 7/10297; G06K
19/0723; G06K 19/07722
See application file for complete search history.

(56) References Cited

U.S. PATENT DOCUMENTS

| | | | |
|---|---|---|---|
| 2011/0007381 A1* | 1/2011 | Paolini, Jr. .............. | G02F 1/167 |
| | | | 359/296 |
| 2014/0340430 A1* | 11/2014 | Telfer ..................... | G02F 1/167 |
| | | | 345/107 |
| 2020/0160135 A1* | 5/2020 | Lowe .............. | G06K 19/07722 |

OTHER PUBLICATIONS

C. G. Raghavendra, S. Akshay, P. Bharath, M. Santosh and D.
Vishwas, "Object tracking and detection for short range surveillance
using 2D ultrasonic sensor array," 2016 International Conference on
Circuits, Controls, Communications and Computing (I4C), Banga-
lore, India, 2016, pp. 1-4, doi: 10.1109/CIMCA.2016.8053267.

* cited by examiner

*Primary Examiner* — A. Hunter Wilder
*Assistant Examiner* — Joseph M Mutschler
(74) *Attorney, Agent, or Firm* — Weiss & Arons LLP

(57) ABSTRACT

A color-changing smart card may be provided. The smart
card may include a first layer encasing at least a front of the
smart card. The smart card may include a smart chip on the
front of the smart card. The smart chip may be configured for
transmitting and receiving electronic communications to and
from a point of sale ("POS") device. The smart card may
include microcapsules residing on a second layer of the
smart card. When the microcapsules are in a rest state the
first layer may have a first color. When the microcapsules are
in an active state the first layer may have a second color. The
microcapsules may be triggered to change the color in
response to the smart chip receiving an electronic commu-
nication of a status of a transaction initiated by the smart
card at the POS device.

16 Claims, 7 Drawing Sheets

BANK A 1234 5678 9101 2345

JOHN DOE

508

510

504

BANK A 1234 5678 9101 2345

JOHN DOE

502

506

COLOR-CHANGING SMART CARD

FIELD OF TECHNOLOGY

Aspects of the disclosure relate to a smart card with enhanced capabilities.

BACKGROUND OF THE DISCLOSURE

When performing transactions using a smart card, such as a credit card, at a point of sale ("POS") device, the status of the transaction may be displayed on a display screen at the POS. The status of the transaction may also be printed out on a piece of paper and/or in the form of an email received on a computing device after the transaction has been completed.

The display of the status of the transaction, in some embodiments, may take longer than the usual time. Sometimes it may seem that the transaction did not go through and a user may swipe or tap the card a second time to perform the transaction. This may lead to performing a transaction twice unnecessarily.

It would be desirable, therefore, to enable a smart card to provide a visual representation of a success or failure of a transaction in real time.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
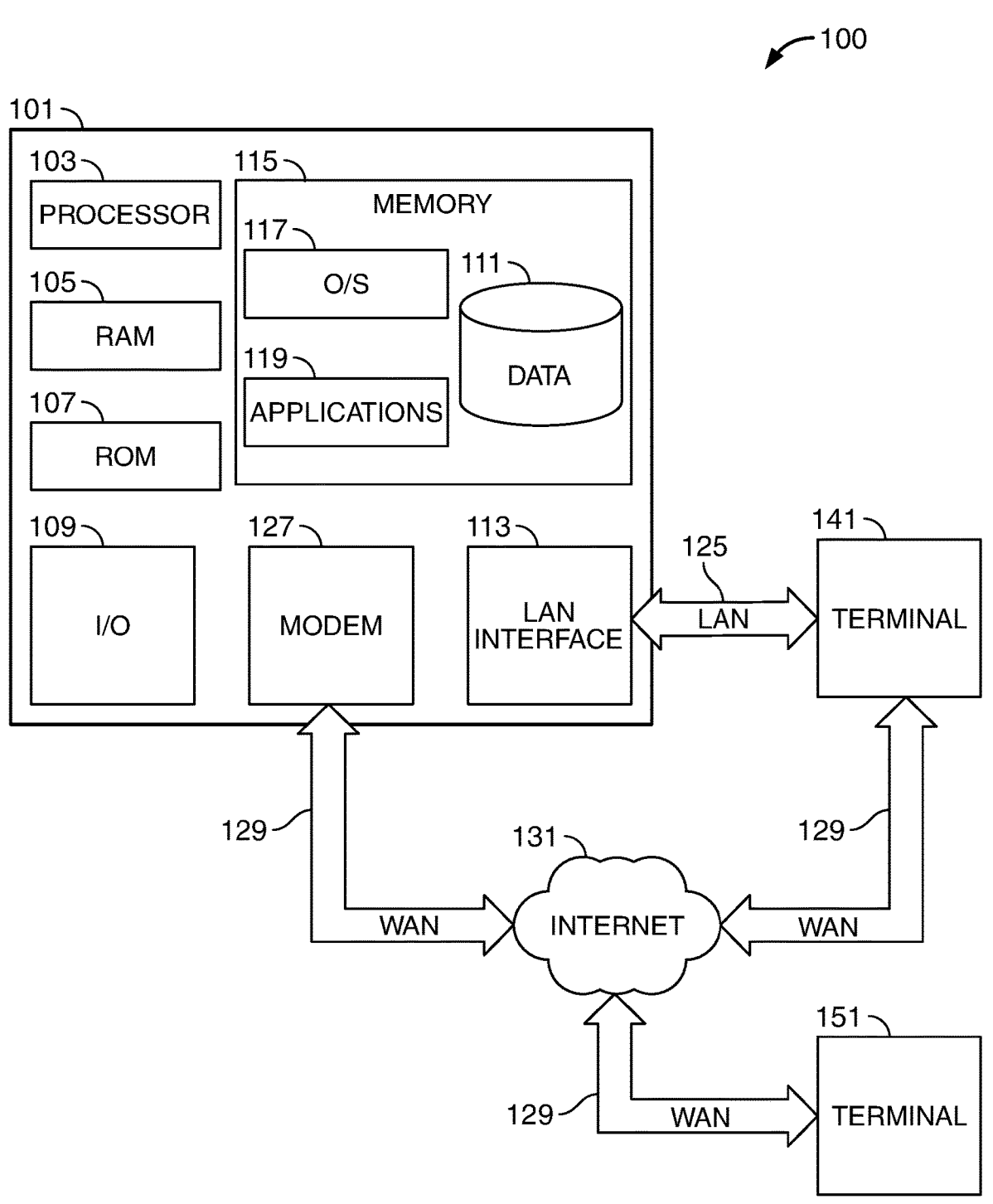
FIG. 1 shows an illustrative block diagram in accordance with principles of the disclosure.

Apparatus and methods for changing a color of a smart card may be provided. Color-changing smart cards may increase transactional efficiency and security. For example, efficiency may be increased by providing a visual representation of the status of the transaction at the smart card itself. Security may be increased by tracking the location of the smart card using ultrasonic wave tracking.

A color-changing smart card is provided. The smart card may include a first layer encasing at least a front of the smart card. The first layer may be transparent. The first layer may be translucent.

The smart card may include a smart chip on the front of the smart card. The smart chip may include a microprocessor and a memory. The smart chip may be configured for transmitting and receiving electronic communications to and from a point of sale ("POS") device.

The smart chip may be configured to electronically communicate with the POS device. The smart chip may be configured to electronically communicate with a mobile application associated with a user of the smart card.

The smart chip may be configured to receive an electronic communication, from the POS, comprising a transaction status. The electronic communication may be transmitted following an initiation and processing of a transaction between the smart card and the POS. Electronic communication between the POS and the smart card may be via ultrasonic waves.

The smart chip may be a Europay, Mastercard and Visa ("EMV") chip.

The smart card may include near-field communication ("NFC") capabilities. NFC capabilities may enable the transmitting and receiving of the electronic communications between the smart chip and the POS.

The smart card may also include microcapsules embedded in the smart card. The microcapsules may reside on a second layer of the smart card. The second layer may be underneath the first layer.

The microcapsules inside the smart card may have white and black pigments. The microcapsules inside the smart card may have a plurality of colors. The plurality of colors may include the black and white pigments. The plurality of colors may not include the black and white pigments.

The microcapsules may either be in a rest state or an active state. When the microcapsules are in a rest state, the first layer may have a first color. When the microcapsules are in the active state, the first layer may have a second color.

The microcapsules may be in the rest state when the smart card may be in a rest state. The smart card may be in the rest state when transactional activity is not being performed. The smart card, in some embodiments, may remain in the rest state during the execution of a process until transactional status may be received. In some embodiments, as soon as the smart card initiates a transaction, i.e. —tap, swipe or insert of the smart card at the POS, the smart card is in the active state and the microcapsules may be triggered to change colors of the smart card.

The first color of the smart card may be the default color. The smart card may include the default color when the smart card is not in an active state, i.e. —performing a transaction.

The second color may be one of at least two colors. In some embodiments, the second color may be one of two, three, four, five or more colors depending on the state of the transaction.

Electrophoresis may be used to toggle the microcapsules between the rest state and the active state. The electrophoresis technique may move the pigments and assist in changing the color of the first layer of the smart card.

The microcapsules may be triggered to change from the rest state to the active state in response to the smart chip receiving an electronic communication from the POS including transaction status.

The electronic communication received from the POS may include a data packet. The data packet may include the transaction status. Based on a value of the transaction status that may be set in the parameters of a data packet, the pigments may be collected at the surface of the microcapsules which may result in a display of a particular color.

The smart card may have a thickness wherein the smart card, at its thickest point, may not be thicker than 0.8 millimeters ("mm"). A width and height of the smart card may not be less than 90% of a width of 86 mm and not less than 90% of a height of 54 mm.

A user of the smart card may be enabled to customize the color of the first layer on the smart card. The customization may occur via a mobile application running on a mobile device associated with the user of the smart card. A color for each value of the transaction status may be selected at the mobile application.

The mobile application may be in electronic communication with the smart card via the microprocessor at the smart chip.

Additionally, when the transaction status is received at the smart card, the smart card may push a notification to the mobile application. The notification may include transaction details including the transaction status. The notification may be displayed to the user. The notification may be displayed to include on a user interface ("UI") of the mobile device, the color of the smart card and transaction status details.

The transaction status details may include the value of the transaction status. The value may be one of 'failed,' 'success,' 'denied,' 'in progress,' or any other suitable status. The transaction status details may also include an identification of the smart card and a name and/or location of the POS device—i.e. —name of merchant where POS device is situated.

In some embodiments, following a pre-determined amount of time where the smart card is retaining the second color, the microcapsules may be activated to restore the smart card to the first color. The pre-determined amount of time may be a few seconds. The pre-determined amount of time may be less than a few seconds. The pre-determined amount of time may be one minute. The pre-determined amount of time, in some embodiments, may be until the next transaction is initiated.

In some embodiments, the microcapsules may be in one of three states. The first state may be the rest state. The second state may be the active state. The third state may be the waiting state.

The microcapsules may be in the waiting state upon initiation of the transaction. As long as the transaction is in progress, the microcapsules may remain in the waiting state. The microcapsules may be triggered to display a third color when in the waiting state. The third color may be indicative that the request to perform the transaction has been received and is in middle of being processed.

The first color, the second color and the third color may be changeable via the user's account associated with a user of the smart card. The user's account may be stored within a mobile application on the computing device. The mobile application may be in electronic communication with the smart card for updating the customization of the colors selected by the user.

The smart card may include metal and/or plastic. The smart card may have dimensions that conform to the ISO/IEC 7810 ID-1 standard. The dimensions may, in some embodiments, be no greater than 86 millimeters×54 millimeters×0.8 millimeters.

In some embodiments of the smart card, the wireless interface may include a wireless network interface card ("NIC"). In some embodiments, the power source may be rechargeable. The power source may recharge via solar energy, inductive charging, a charging port, and/or any other suitable charging mechanism.

In some embodiments, the smart card may include a payment interface to resolve different payment options to different secure payment gateways.

In some embodiments, the smart card may include a phone to bank resolver that associates contact phone numbers with accounts at financial institutions or other smart card issuers.

In some embodiments, the smart card may include a reverse payment initiator that may be configured to request a payment amount from a contact bank account and contact smart card and send payment instructions to a payment gateway.

In some embodiments, the microprocessor, the power source, the wireless interface, the payment interface, and/or the memory may be embedded in the smart card. The touch sensitive screen may be affixed to the smart card and may be exposed on a surface of the smart card.

The smart card may include hardware and associated integrated circuitry for users to complete online payments without entering sensitive transaction information into a third-party system such as a web browser or other software applications. The smart card may include a touch-sensitive screen. The smart card may include a virtual keypad. The user may depress keys on the keypad or use the touch-sensitive screen to enter information directly into the smart card.

The microprocessor and associated NIC may enable the card to establish a communication channel. Over the secure communication channel, the smart card may interact directly with a secure system for making a payment. The secure system may be operated by an issuer of the smart card. The microprocessor may have a thickness that is not greater than 0.25 millimeters ("mm"). The microprocessor may control the overall operation of the smart card and its associated components.

The smart card may include various other hardware components. Such components may include a battery, a speaker, and antenna(s). The smart card may include RAM, ROM, an input/output ("I/O") module and a non-transitory or non-volatile memory.

The I/O module may include a microphone which may accept user provided input. The I/O module may include one or more speakers for providing audio output and a display for providing textual, audiovisual and/or graphical output.

Software may be stored within the non-transitory memory and/or other storage media. Software may provide instructions, that when executed by the microprocessor, enable the smart card to perform various functions. For example, software may include an operating system, application programs, web browser and a database. Alternatively, some or all of computer executable instructions of the smart card may be embodied in hardware or firmware components of the smart card. Application programs, which may be used by the smart card, may include computer executable instructions for invoking user functionality related to communication, authentication services, and voice input and speech recognition applications.

Application programs may utilize one or more algorithms that encrypt information, process received executable instructions, interact with an issuer or acquirer bank systems, perform power management routines or other suitable tasks.

The smart card may include a pressure sensitive button. The pressure sensitive button may have a thickness that is not greater than 0.8 mm. A user may actuate the pressure sensitive to power on or off one or more components of the smart card. For example, actuating the pressure sensitive button may activate the microprocessor, NIC, touch-sensitive screen of the smart card.

The smart card may operate in a networked environment. The smart card may support establishing communication channels with one or more issuer or acquirer bank systems. The smart card may connect to a local area network ("LAN"), a wide area network ("WAN") a cellular network or any suitable communication network. When used in a LAN networking environment, the smart card may be connected to the LAN through a network interface or adapter. The NIC may include the network interface or adapter.

When used in a WAN networking environment, the smart card may include a modem or other means for establishing communications over a WAN, such as the Internet. The NIC may include the modem. It will be appreciated that the existence of any of various well-known protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, other smart cards, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic hardware components of the smart card. For example, the battery may supply power to a touch-sensitive screen, NIC and microprocessor. The battery may have a thickness that is not greater than 0.5 mm.

In some embodiments, the smart card may include an electrical contact. The battery may be recharged via an electrical contact when the smart card is inserted into an Automated Teller Machine ("ATM"). An electrical contact may be constructed using any suitable material that conducts or transfers electricity. The smart card may include a plurality of electrical contacts. An electrical contact may be accessible on any suitable face of a housing of the smart card. The contact may be utilized to transfer electrical charge to the rechargeable battery when the smart card is inserted into a card reader of the ATM. In some embodiments, the smart card's power source may include high frequency signals received from an ATM or other network node. The smart card may be configured to utilize received high frequency signals to recharge the battery or provide power to other hardware components of the smart card. The high frequency signals may conform to a standardized near field communication (NFC) communication standard.

A method for varying a color of a smart card during a transaction process is provided. The varying of the color may be triggered in response to receipt of an electronic communication from a POS device at the smart card.

The smart card may include a first layer and a second layer. The smart card may not be limited to include only a first layer and second layer. The smart card may include a plurality of layers. The first layer may encase at least a front of the smart card. The first layer may be transparent or translucent. The first layer may have a first color. The second layer may be, in some embodiments, underneath the first layer. The second layer may include microcapsules for changing the color of the smart card.

The method may include initiating a transaction at a POS device. The transaction may be initiated between the smart card and a merchant associated with the POS device.

In some embodiments, following the initiating, the method may include activating the microcapsules at the smart card to partially change the color of the smart card. Partial changing may indicate that the transaction is in the middle of being processed. When the user sees the partial color change, the user may be made aware that the initiation of the request to perform a transaction has been received at the back end and the transaction is in middle of being processed. This may prevent the user re-swiping the card due to unclarity of receipt of the initiation of the transaction.

Following the initiation, the method may include emitting, from the POS device to the smart card, ultrasonic waves for tracking an exact location of the smart card.

Ultrasonic waves may be suitable for short-range communication. Data may be transmitted through sound waves. When using soundwaves for ultrasonic tracking, the soundwaves may be picked up by device microphones to gather data, pinpoint a user's location and the device location, i.e. —smart card. The methodology may utilize sounds that cannot be heard by humans, but can be detected by various devices, such as smartphones and tablets. Ultrasonic tracking may be used to identify the exact location of the smart card.

Ultrasonic waves may be used in noisy environments, including large stadiums, and allow transmission over 100 meters. The sound data payload may then be provisioned to achieve any custom, desirable action on the receiving device. These signals may be secure and may not occupy the electromagnetic spectrum (Wi-Fi, 4G/5G or Bluetooth). Leveraging ultrasonic waves may enable the data to be unsolvable to many traditional hacking techniques. Additionally, encryption methods like SHA-256 or MD5 can be applied to the data as an additional layer of security.

Additionally, when the ultrasonic wave is emitted immediately following the swipe, scan or tap of the smart card, the ultrasonic wave may be enabled to track the location of the smart card continuously while the transaction is in progress.

In response to the emitting, the method may include determining the exact location of the smart card via the ultrasonic waves reflected back to the POS device.

The method may further include generating, via the POS device, a unique ultrasonic wave ID for the smart card. The POS device may leverage the ultrasonic wave ID each time the POS device communicates with the smart card.

The method may further include processing the transaction at a back-end server associated with the POS device. The back-end server may process the transaction with a financial institution associated with a user's account and with the merchant associated with the transaction being performed.

The method may also include following the processing, receiving, at the smart card, ultrasonic waves from the POS device. The ultrasonic waves may be transmitting data associated with the transaction. The ultrasonic waves may transmit a data packet to the smart card. The data packet may be generated at the back-end server associated with the POS device. The data packet may include a transaction status of the transaction and the unique ultrasonic wave ID.

In response to the receiving, the method may include activating via a microprocessor at the smart card, microcapsules residing on the smart card to change the color of the smart card. The microcapsules may, in combination with electrophoresis, change a color of the smart card. The color may be based on the value of the transaction status.

The method may include, when the smart card is in the rest state, maintaining the color of the smart card to the default color. The method may include, when the smart card is in an active state, altering the color to a second color. The second color may be one of two or more colors. The second color may indicate a status of the processing of the transaction.

It should be appreciated that electrophoresis may be used to toggle the microcapsules between the rest state and the active state.

In some embodiments, upon initiation of the transaction, the smart card may be in the active state and the microcapsules are triggered upon initiation of the transaction to change the color of the smart card.

In some embodiments, upon receiving of the transaction status, the state of the smart card is changed from the rest state to the active state. At the time of the receipt of the transaction status, the microcapsules may be triggered to change the color of the smart card.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative block diagram of system 100 that includes computer 101. Computer 101 may alternatively be referred to herein as an "engine," "server" or a "computing device." The computing system may include one or more computer servers 101. Computer 101 may be any computing device described herein, such as the smart card, the POS device and the back-end server. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all of the elements described above relative to computer 101.

When used in a LAN networking environment, computer 101 is connected to LAN 125 through a LAN interface 113 or an adapter. When used in a WAN networking environment, computer 101 may include a modem 127 or other means for establishing communications over WAN 129, such as Internet 131.

In some embodiments, computer 101 may be connected to one or more other systems via a short-range communication network (not shown). In these embodiments, computer 101 may communicate with one or more other terminals 141 and 151, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may include any one or more of the applications, instructions and algorithms associated with and/or embedded within the smart card, the POS device and any other applications described herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smart phones, multi-processor systems, microprocessor-based systems, cloud-based systems, programmable consumer electronics, network PCs, minicomputers, mainframe computers, distributed computing environments that include any of the above systems or devices, and the like.

Figure 2:
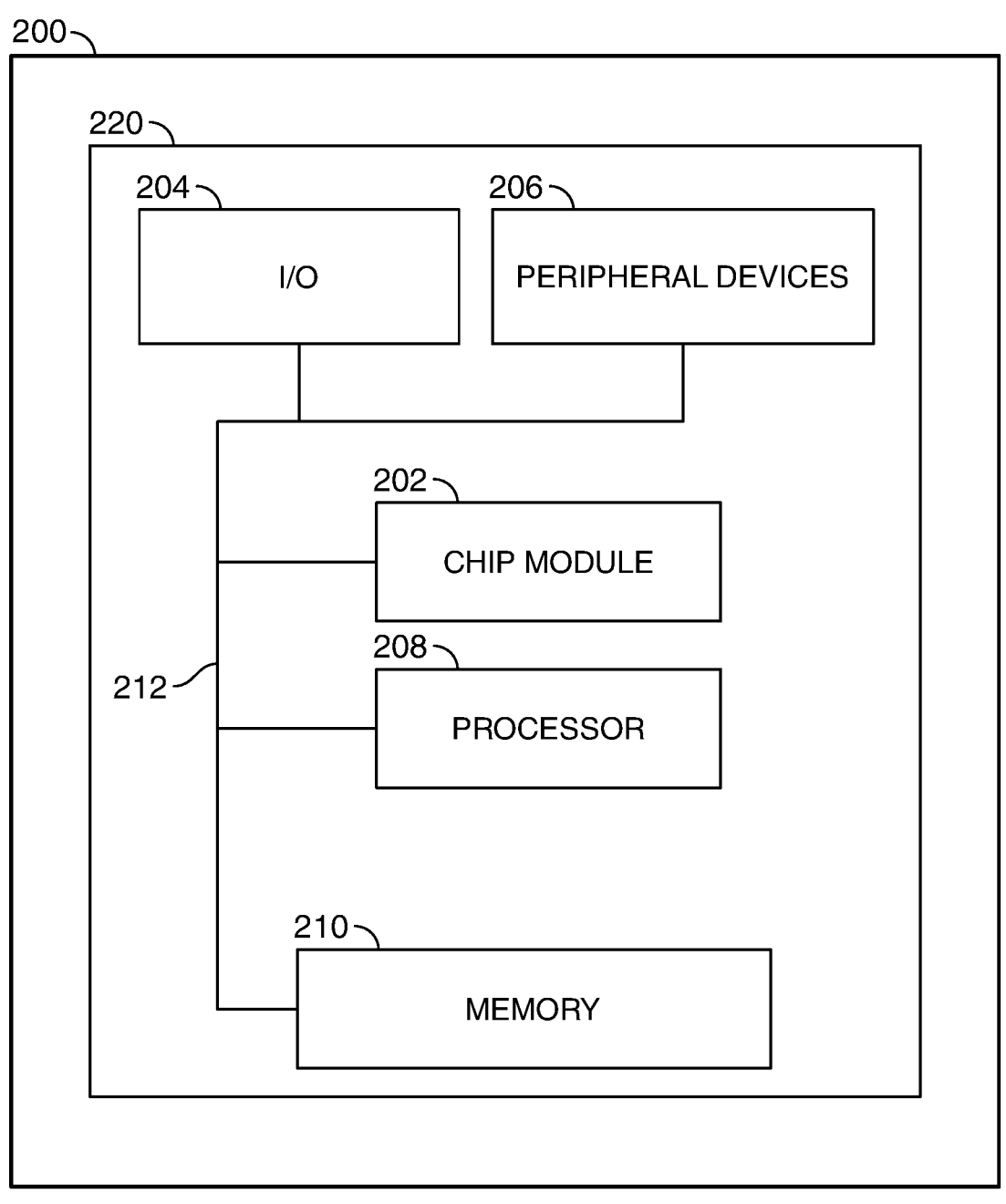
FIG. 2 shows an illustrative apparatus that may be configured in accordance with principles of the disclosure.

FIG. 2 shows illustrative apparatus 200 that may be configured in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
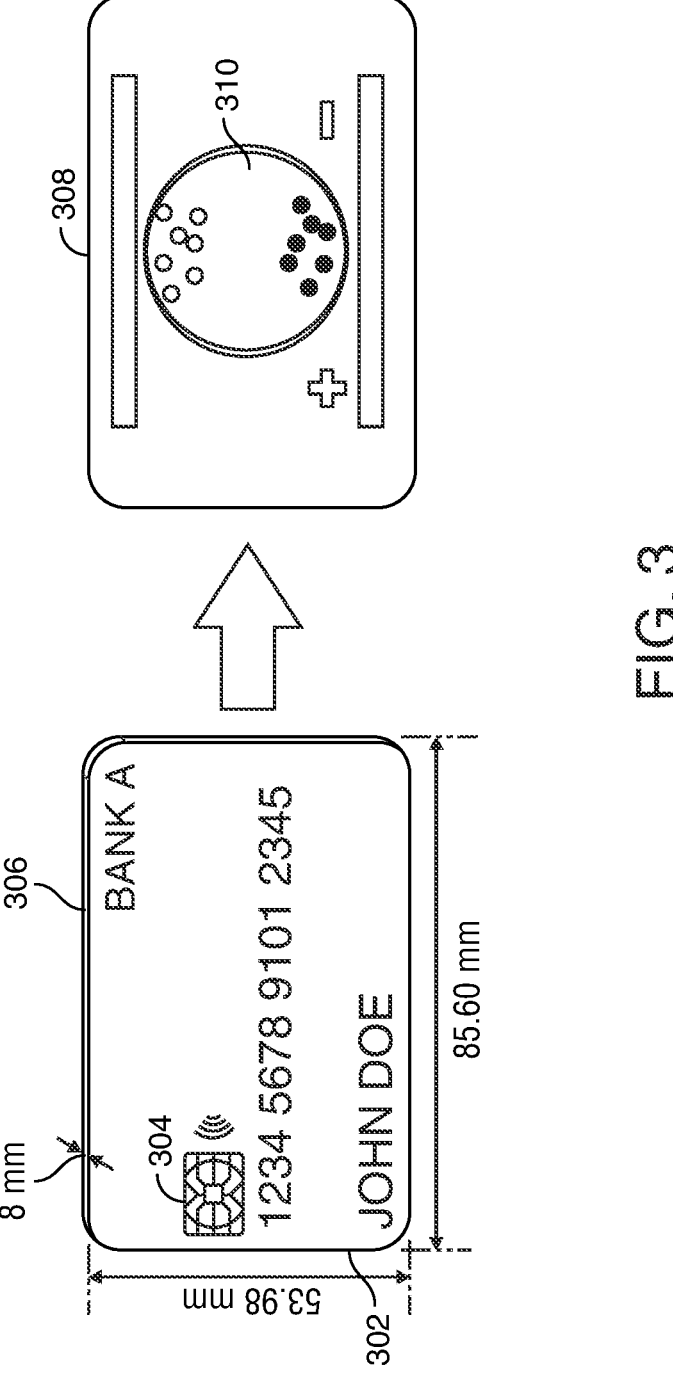
FIG. 3 shows an illustrative diagram in accordance with principles of the disclosure.

FIG. 3 shows an illustrative architecture diagram of the smart card in accordance with principles of the disclosure.

Smart card 302 may be a card configured for performing transactions. Smart card 302 may include metal and/or plastic. The card may have dimensions that conform to the ISO/IEC 7810 ID-1 standard. The dimensions may, in some embodiments, be no greater than 86 millimeters×54 millimeters×0.8 millimeters, as shown at 306.

Smart card 302 may include smart chip 304. Smart chip 304 may include a microprocessor and memory. Smart chip 304 may transmit and receive electronic communications from a POS device. Smart chip 304 may transmit and receive electronic communications from a mobile application running on a computing device associated with a user of the smart card 302.

Smart card 302 may include a first layer and a second layer. The first layer may be transparent. The first layer may display the front of the card. The second layer may include the microcapsules, as shown at 308.

Second layer 308 may include different color pigments 310 for altering the change in color at the first layer of smart card 302. Second layer 308 may use electrophoresis techniques to move the different pigments around which may assist in changing the color of the card.

Figure 4:
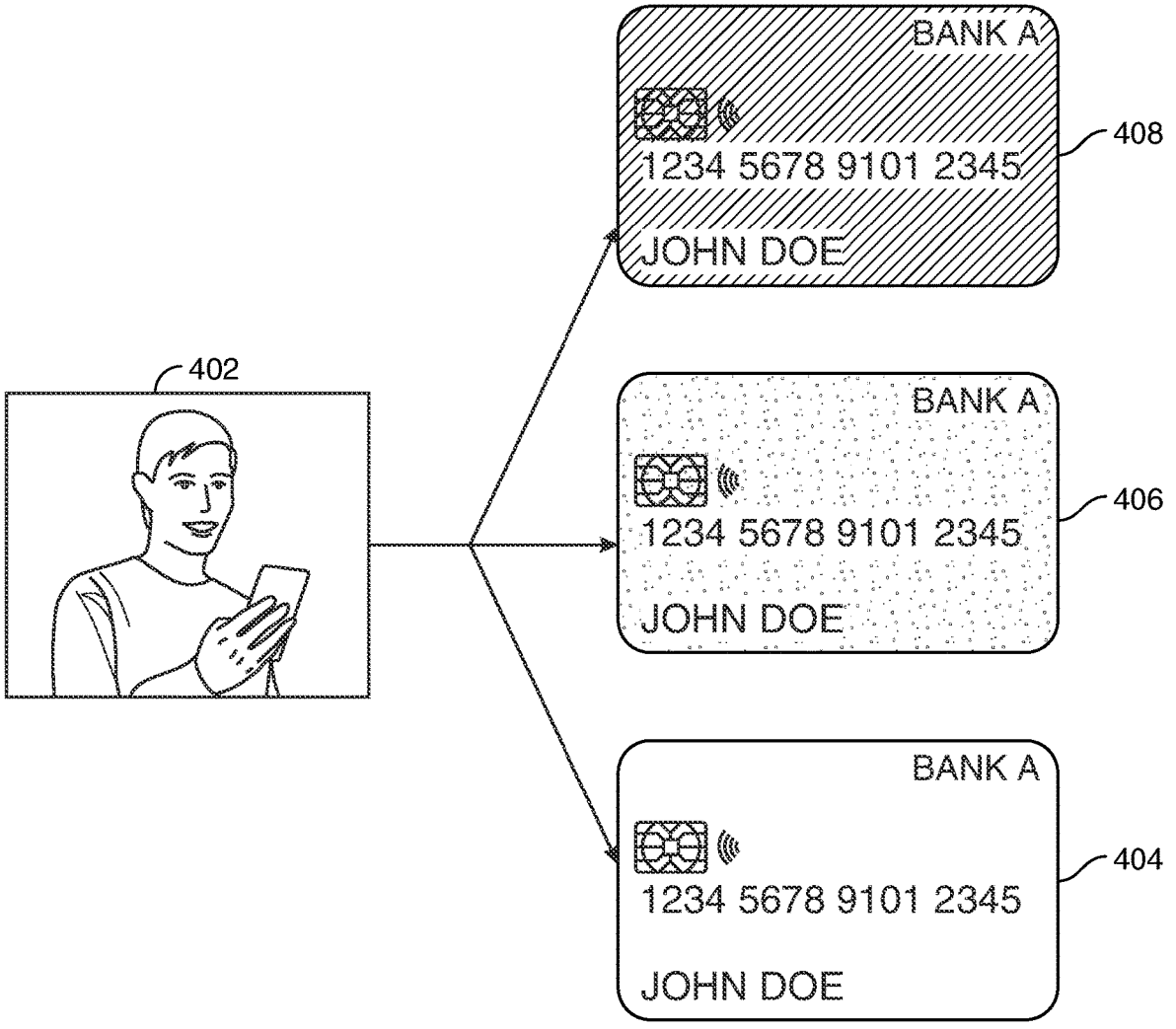
FIG. 4 shows an illustrative diagram in accordance with principles of the disclosure.

FIG. 4 shows an illustrative diagram of communication between a smart card and a mobile application. The communication may be an electronic communication between the smart card and the mobile application. The mobile application may be running on a computing device associated with the user of the smart card. The mobile application may enable customizing the colors of the smart card.

In this diagram, smart card 404 may include the default color. The smart card may include the default color when activity and/or transactions may not be in progress. The default color may be selected by the user. The default color may be changed at any time.

Smart card 406 may include a color selected by the user when smart card 406 is in an active state and the transaction may be successful.

Smart card 408 may include a color selected by the user when smart card 408 is in the active state and the transaction may not be successful.

It should be appreciated that smart card 408 may not be limited to three color changes. Smart card 408 may be enabled to alter between one, two, three, four or more colors depending on the status of the smart card and/or the status of the transaction being processed.

Figure 5:
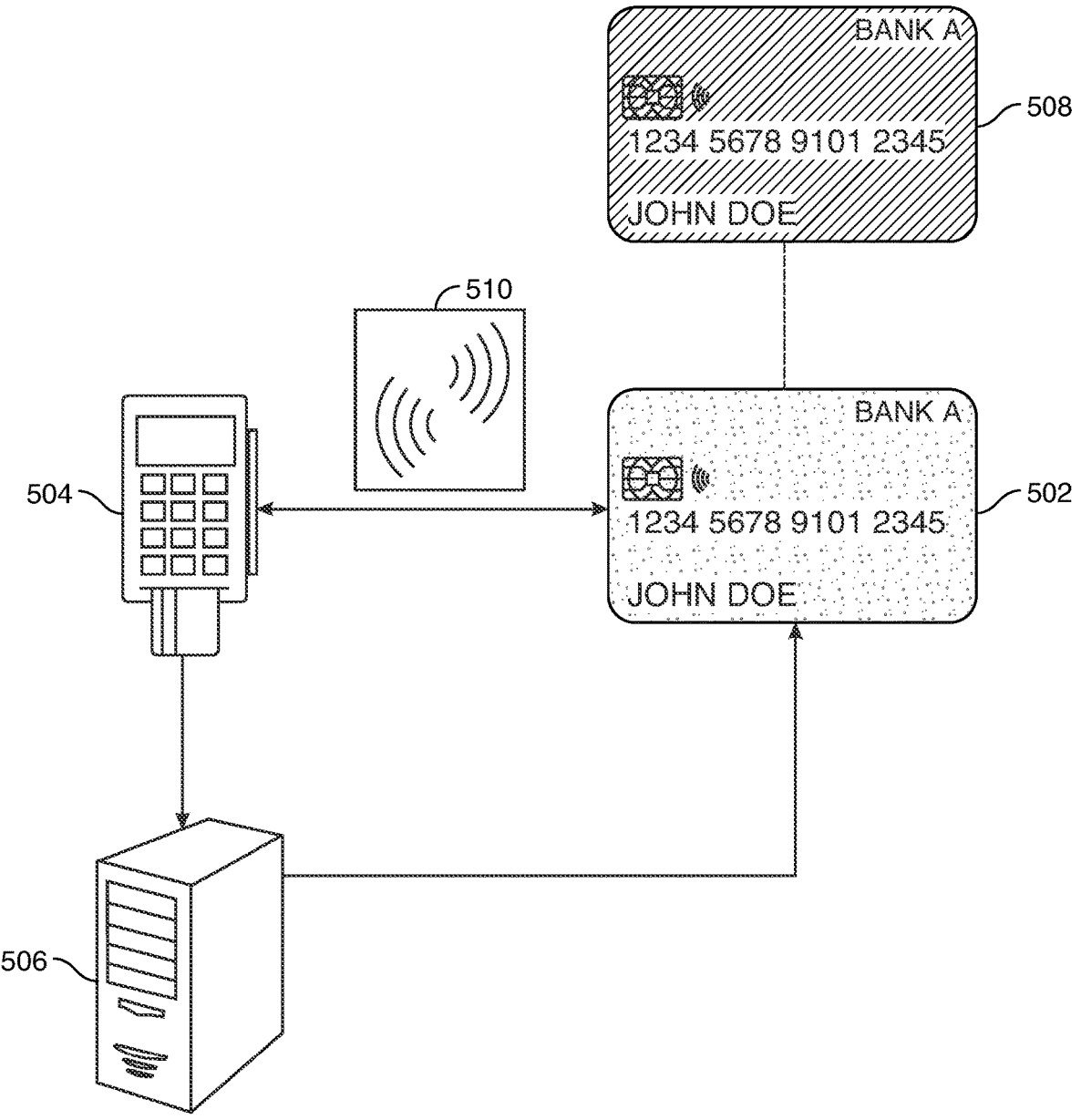
FIG. 5 shows an illustrative flow diagram in accordance with principles of the disclosure.

FIG. 5 shows an illustrative architecture diagram in accordance with principles of the disclosure.

Smart card 502 may initiate a transaction at POS device 504. The transaction may be initiated via a swipe, scan, tap or any other suitable initiation.

POS device 504 may include ultrasonic sound tracking mechanisms 510 for emitting ultrasonic sound waves at smart card 502. Ultrasonic sound tracking 510 may enable determining the exact location of smart card 502.

When POS device 504 links to smart card 502 via the ultrasonic sound waves, a unique ID may be assigned to smart card 502 and other cards may not be able to intervene. The unique ID may remain with the smart card and the POS device may communicate only with the smart card that includes the unique ID. This may at least minimize possible fraud.

Following the initiation of the transaction, POS device 504 may transmit the transaction for processing at a back-end server 506.

Upon completion of the processing of the transaction, back-end server 506 may transmit results of the transaction to POS device 504. POS device 504 may transmit the transaction status embedded to smart card 502. The transaction status may be included in a data packet. The color of smart card 502 may be changed based on the value of the transaction status, as shown at 508.

For example, when the transaction is successful, smart card 508 may turn to the color green. When the transaction is not successful smart card 508 may turn to the color red.

In some embodiments, when the transaction is in progress, smart card 508 may be another color. The color may indicate to the user that the transaction has been initiated and is still in progress.

Figure 6:
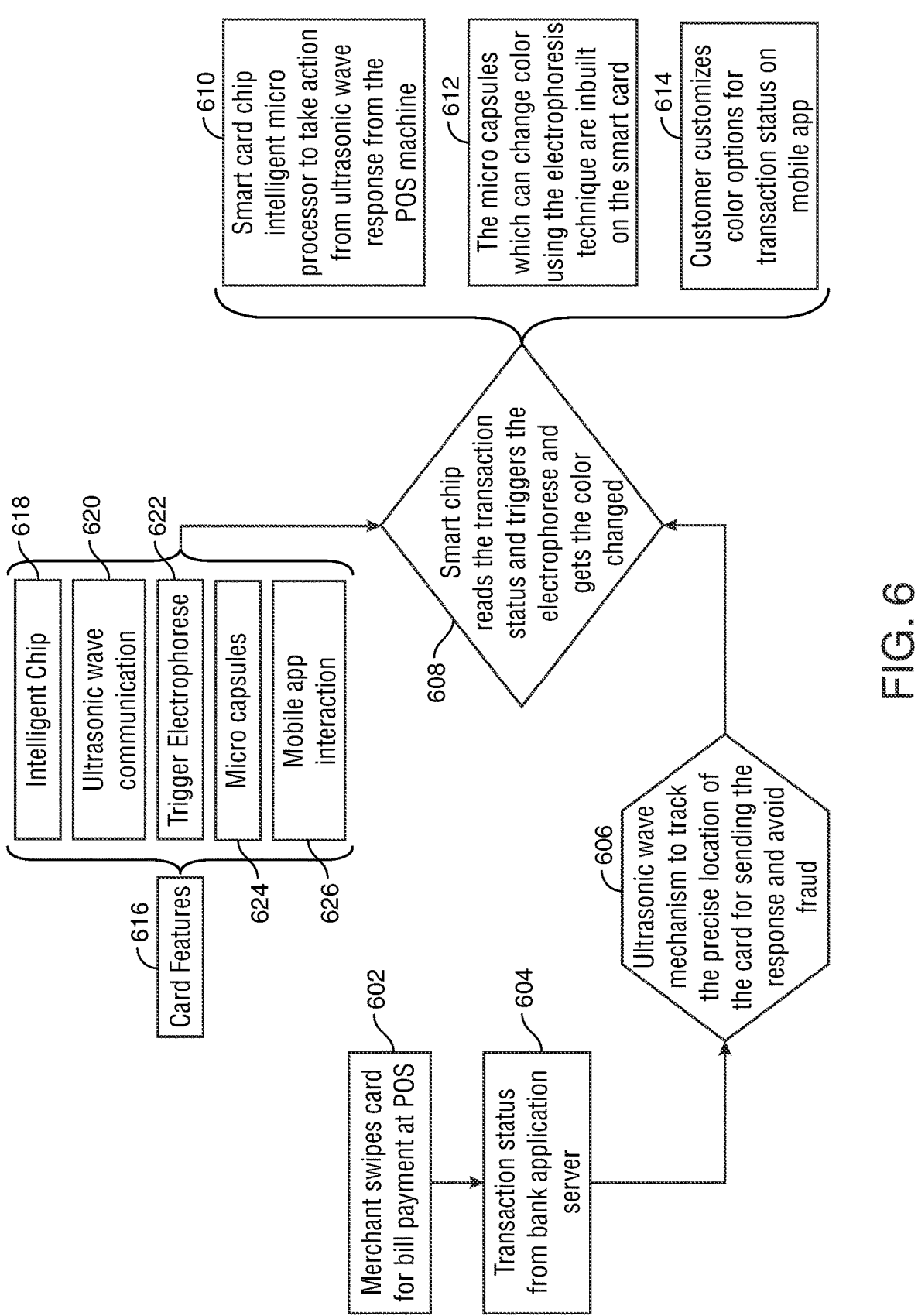
FIG. 6 shows an illustrative flow chart in accordance with principles of the disclosure.

FIG. 6 shows an illustrative exemplary flow chart in accordance with principles of the disclosure.

At step 602, a merchant may swipe the smart card for bill payment at a POS device. The merchant may be prompted to make one or more selections at a user interface ("UI") on the POS device for processing the bill payment.

The smart card may include a plurality of features, shown at 616. Smart card may include an intelligent chip 618. The intelligent chip 618 may be an EMV chip. Smart card may include ultrasonic wave communication capabilities 620. Smart card may include electrophorese techniques that may be triggered for moving pigments to assist in changing the color of the smart card, as shown at 622. Smart card may include microcapsules 624 for changing the color of the smart card. Smart card may be enabled for electronic communication with a mobile application running on a computing device, as shown at 626. The mobile application may store the colors selected by the user of the smart card when displaying transaction status to the user via the smart card.

Following the processing of the bill payment, transaction status from a bank application server may be generated, as shown at step 604. The transaction status may need to be transmitted to the smart card for display to the merchant. The display may be a color-change of the smart card.

At 606, ultrasonic wave mechanisms may trigger an ultrasonic wave to track the precise location of the smart card in order to identify where to transmit the transaction status to and simultaneously avoid fraud.

At 608, a smart chip embedded in the smart card may read the transaction status received and trigger the microcapsules in combination with electrophorese to change the color of the smart card.

Smart chip embedded on the smart card may include features 610, 612 and 614. At 610, smart chip may include an intelligent microprocessor to take action in response to receipt of ultrasonic wave response from the POS device.

Smart chip may include microcapsules which can change color using the electrophoresis technique inbuilt on the smart card, as shown at 612.

Color-change of the smart card may be customized on the mobile application by the user of the smart card, as shown at 614.

Figure 7:
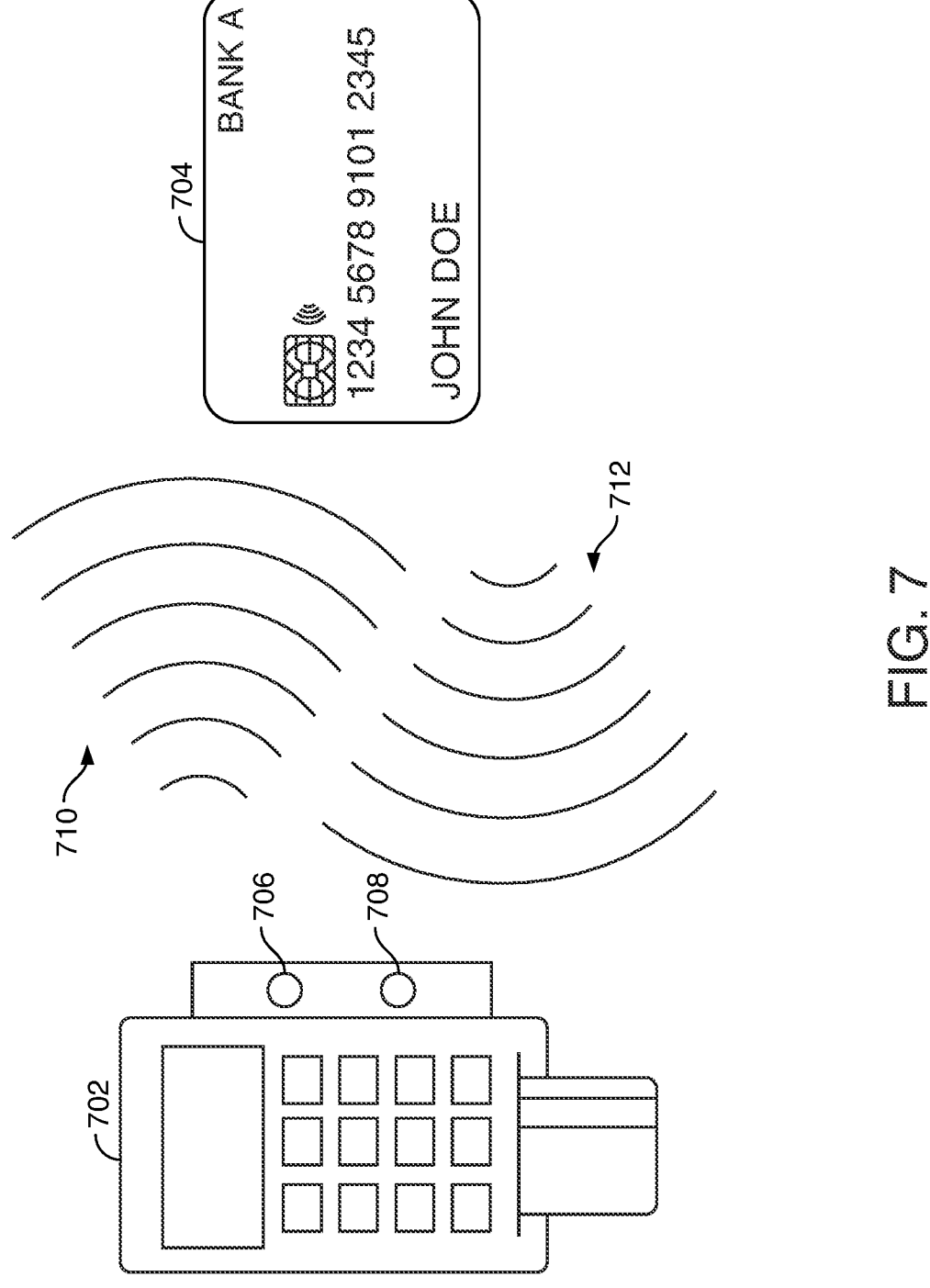
FIG. 7 shows an illustrative diagram in accordance with principles of the disclosure.

FIG. 7 shows an illustrative diagram of ultrasonic waves being used for electronic communication between POS device 702 and smart card 704.

POS device 702 may include an emitter 706 and a detector 708 for ultrasonic wave communication.

Ultrasonic waves emitted from POS device 702 may be shown at 710. Ultrasonic waves reflected back at the POS device 702 from smart card 704 may be shown at 712.

Thus, systems and methods for providing a visual representation of a success or failure of a transaction in real time is provided. Persons skilled in the art will appreciate that the present invention can be practiced by other than the described embodiments, which are presented for purposes of illustration rather than of limitation.

What is claimed is:

1. A color-changing smart card comprising:
a first layer encasing at least a front of the smart card, the first layer being transparent or translucent;
a smart chip on the front of the smart card comprising a microprocessor and a memory, the smart chip configured for transmitting and receiving electronic communications to and from a point of sale ("POS") device, the smart chip configured to receive an electronic communication, from the POS, comprising a transaction status following an initiation of a transaction between the smart card and the POS;
near-field communication ("NFC") capabilities to enable the transmitting and receiving of the electronic communications between the smart chip and the POS;
microcapsules residing on a second layer of the smart card, wherein:
electrophoresis is used to toggle the microcapsules between a rest state and an active state;
the first layer has a first color when the microcapsules are in the rest state; and the first layer has a second color when the microcapsules are in an active state; and the microcapsules are triggered in response to the smart chip receiving the electronic communication;

a thickness wherein the smart card, at its thickest point, is not thicker than 0.8 millimeters ("mm"); and a width and height of the smart card is not less than 90% of a width of 86 mm and not less than 90% of a height of 54 mm.

2. The smart card of claim 1 wherein the smart chip is a Europay, Mastercard and Visa ("EMV") chip.

3. The smart card of claim 1 wherein the microcapsules comprise black and white pigments.

4. The smart card of claim 1 wherein the microcapsules comprise a plurality of colored pigments.

5. The smart card of claim 1 wherein the first color is a default color.

6. The smart card of claim 1 wherein the first color and the second color are changeable via a user's account associated with a user of the smart card, the user's account stored within a mobile application on a computing device, the mobile application in electronic communication with the smart card.

7. The smart card of claim 6 wherein the smart card is configured for being in electronic communication with the mobile application.

8. The smart card of claim 1 wherein the second color is one of two colors based on a value of the transaction status.

9. The smart card of claim 1 wherein each of the electronic communications are transmitted using ultrasonic waves.

10. The smart card of claim 6 wherein, when the smart card has the second color, the smart card automatically transmits an electronic communication to the mobile application for displaying a notification of the transaction status on a user interface ("UI") of the mobile application.

11. The smart card of claim 1 wherein, following a pre-determined amount of time where the smart card is retaining the second color, the microcapsules are activated to restore the smart card to the first color.

12. The smart card of claim 1 wherein the second layer is underneath the first layer.

13. A method for varying a color of a smart card during a transaction process, the method being performed at the smart card itself, the method comprising:

initiating a transaction at a point of sale ("POS") device between the smart card and a merchant associated with the POS device, wherein the smart card includes a first layer encasing at least a front of the smart card, the first layer being transparent or translucent, wherein the smart card, at its thickest point, is not thicker than 8 millimeters ("mm"), and a width and height of the smart card is not less than 90% of a width of 86 mm and not less than 90% of a height of 54 mm;

emitting, from the POS device to the smart card, ultrasonic waves for tracking an exact location of the smart card;

determining the exact location of the smart card via ultrasonic waves reflected back to the POS device;

generating, via the POS device, a unique ultrasonic wave ID for the smart card; processing the transaction at a back-end server associated with the POS device;

following the processing, receiving, at the smart card, ultrasonic waves comprising a data packet, the data packet generated at a back-end server associated with the POS device, the data packet comprising a transaction status and the unique ultrasonic wave ID; and in response to the receiving, activating via a microprocessor on the front of the smart card, a microcapsules residing on a second layer of the smart card in combination with electrophoresis to change a color of the first layer of the smart card between a rest state and an active state, the color being based on the transaction status.

14. The method of claim 13 wherein the initiating the transaction is in response to a tap of the smart card at the POS device.

15. The method of claim 14 further comprising, following the initiating, activating the microcapsules at the smart card to partially change the color of the smart card, the partially changing indicating the processing of the transaction.

16. A color-changing smart card comprising:

a first layer encasing at least a front of the smart card, the first layer being transparent or translucent;

a smart chip on the front of the smart card comprising a microprocessor and a memory, the smart chip configured for transmitting and receiving electronic communications to and from a point of sale ("POS") device, the smart chip configured to receive an electronic communication, from the POS, comprising a transaction status following an initiation of a transaction between the smart card and the POS;

near-field communication ("NFC") capabilities to enable the transmitting and receiving of the electronic communications between the smart chip and the POS;

microcapsules residing on a second layer of the smart card, wherein:

the microcapsules comprise a plurality of colored pigments;

electrophoresis is used to toggle the microcapsules between a rest state, an active state and a waiting state;

the first layer has a first color when the microcapsules are in the rest state, the first color being a default color; and the first layer has a second color when the microcapsules are in an active state;

the first layer has a third color when the microcapsules are in a waiting state;

the first color, the second color and the third color are changeable via a user's account associated with a user of the smart card, the user's account stored within a mobile application on a computing device, the mobile application in electronic communication with the smart card;

the microcapsules are triggered in response to the smart chip receiving the electronic communication;

a thickness wherein the smart card, at its thickest point, is not thicker than 0.8 millimeters ("mm"); and a width and height of the smart card is not less than 90% of a width of 86 mm and not less than 90% of a height of 54 mm.

\* \* \* \* \*